Figure 3:
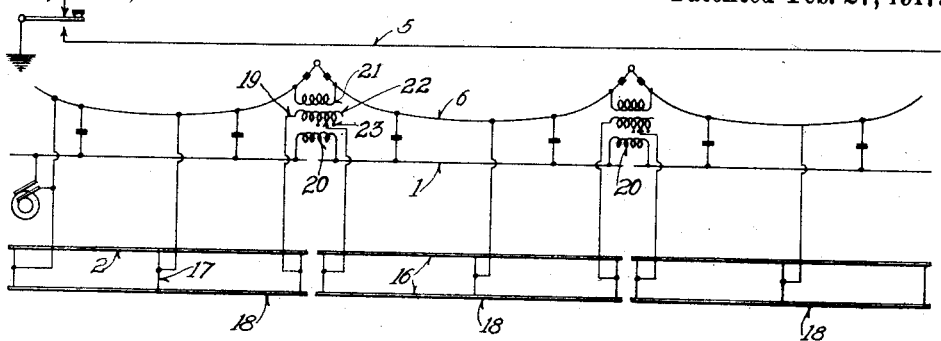

C. F. SCOTT.
MEANS FOR MINIMIZING INDUCTIVE INTERFERENCE.
APPLICATION FILED JAN. 2, 1915.

1,217,511.

Patented Feb. 27, 1917.

WITNESSES:
S. L. Armstrong.
Geo. W. Hansen.

INVENTOR
Charles F. Scott.
BY
Wesley G. Carr
ATTORNEY

UNITED STATES PATENT OFFICE.

CHARLES F. SCOTT, OF NEW HAVEN, CONNECTICUT, ASSIGNOR TO WESTINGHOUSE ELECTRIC AND MANUFACTURING COMPANY, A CORPORATION OF PENNSYLVANIA.

MEANS FOR MINIMIZING INDUCTIVE INTERFERENCE.

1,217,511.                Specification of Letters Patent.        Patented Feb. 27, 1917.

Application filed January 2, 1915. Serial No. 169.

*To all whom it may concern:*

Be it known that I, CHARLES F. SCOTT, a citizen of the United States, and a resident of New Haven, in the county of New Haven and State of Connecticut, have invented a new and useful Improvement in Means for Minimizing Inductive Interferences, of which the following is a specification.

My invention relates to means for minimizing and neutralizing disturbances in electrical circuits that may be caused by electromagnetic induction from other circuits located in proximity thereto.

More particularly, my invention relates to means for protecting telephone, telegraph and other circuits utilized for the transmission of intelligence that are susceptible to slight inductive disturbances and are paralleled for longer or shorter distances by circuits utilized for the transmission of power by alternating currents.

When an intelligence-transmission circuit, as a telephone or telegraph circuit, is located sufficiently close to an alternating-current distributing circuit, as a railway system, to be subjected to the inducing influences arising from alternating currents flowing in the railway system, it is essential for good intelligence transmission that the electromotive forces induced in the intelligence-transmission circuit be either substantially neutralized or minimized to a very low degree.

When a telegraph circuit parallels a railway system, the conductors comprising the telegraph circuit are usually in proximity to the trolley conductor and remotely removed from the track and the earth which, together, constitute the return conductor for the trolley current. Only a portion of the trolley current returns along the track, inasmuch as the impedance of the track is considerably higher than that of the ground. As a result, the inductive effects upon the telegraph circuit of the alternating currents flowing in the track and ground are substantially less than the electromotive forces induced in the telegraph circuit by reason of the currents flowing in the trolley conductor.

In order that the electromotive force induced by the return current shall be equal and opposite to that induced by the current in the trolley conductor, it is desirable that the return conductor and the trolley conductor shall be substantially equally spaced from the telegraph circuit.

By means of my invention, I cause any desired portion of the return current to be carried in a conductor placed near the trolley circuit, and to this end, I utilize the catenary or messenger wire, which constitutes a part of the structure by which the trolley wire is supported.

Figure 1:
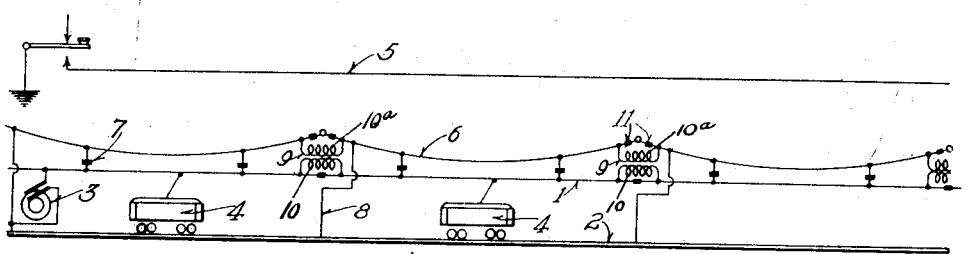
Figure 2:
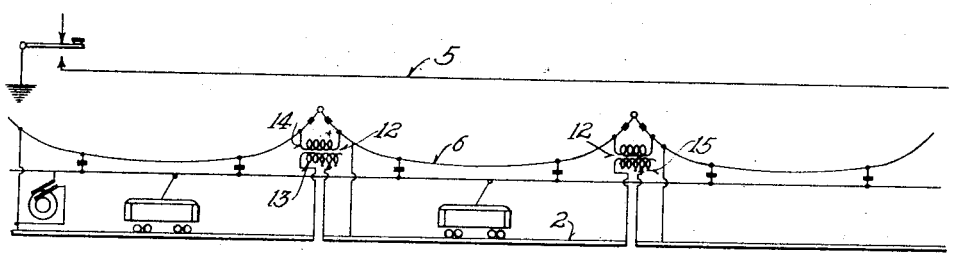

For a better understanding of the nature of my invention, reference may be had to the following description and the accompanying drawing in which Figure 1 is a diagrammatic representation of a railway system embodying my protective means for neutralizing or minimizing inductive disturbances upon an adjacent telegraph circuit, and Figs. 2 and 3 are modifications of the system shown in Fig. 1.

Heretofore, catenary suspension cables have usually been composed of steel or some other material which was primarily chosen because of its tensile strength. As is well known, cables composed of steel strands are entirely unsuitable for conducting alternating currents because of the very high impedance which they offer to the flow of such currents.

Referring to Fig. 1, an electric railway which, for the present purposes may be considered a power transmission system, comprises a trolley conductor 1 and a track 2 that may be supplied with alternating current from any suitable source 3. The conductors 1 and 2, which constitute the transmission system, are adapted to be connected to each other through the circuits embodied in vehicles of the character indicated at 4. Located in proximity to the railway system, as, for instance, upon poles along, or adjacent to, the right-of-way thereof, and at such a distance therefrom as to be within the magnetic field set up by the power transmission conductor, is a conductor 5 of an intelligence-transmission circuit, here shown as a telegraph circuit.

The trolley conductor 1 is supported by a conductor 6 in the well-known type of catenary construction. Suspension-type insulators 7 mechanically connect the trolley conductor 1 to the catenary 6 and thoroughly insulate them from each other throughout their entire length. Electrical conductors 8 connect the track 2, at intervals, to the conductor 6. At spaced intervals along the trolley conductor 1, I insert series transformers 9, the primary windings 10 of which are connected in series circuit with the trolley conductor. Secondary windings 10ª of the series transformers 9 are correspondingly connected in series circuit relationship with the catenary or auxiliary conductor 6. Insulators 11 are employed to insulate and properly support the catenary conductor 6.

Current is supplied to the vehicles 4 through the trolley conductor 1 and returns to the source of supply through conductors comprising the track 2 and the catenary conductor 6. Inasmuch as the return current may flow through the catenary conductor 6, which is disposed closely adjacent to the trolley conductor 1, the magnetic fields generated by the alternating currents flowing in the trolley conductor will be substantially neutralized by the counter magnetic fields established by the return trolley currents flowing in the catenary conductor 6. As a result, the inductive influences upon the conductor 5 are substantially eliminated. The catenary conductor 6 may comprise a plurality of steel and copper strands, the copper strands lending conductivity to the cable, or by other means be made conducting.

In order to insure that substantially all the trolley currents will return along the catenary conductor 6, I inductively link the trolley and catenary conductors by means of series transformers 9. The transformers are preferably made with approximately the same number of turns in the primary and secondary windings and are inserted at frequent intervals along the railway system. When current flows through the trolley conductor 1, a return current that is substantially equal to the trolley current must flow along the conductor 6 by reason of the same number of ampere turns being inserted in the trolley conductor and in the catenary conductor. Currents equal to the magnetizing currents of the transformers will flow back through the circuit comprising the track 2 and ground, but the inductive effects arising from such currents are relatively insignificant.

When the trolley conductor 1 is connected at frequent intervals to trolley feeder conductors, (not shown) the catenary conductor 6 may be inductively linked with the trolley feeder conductors by means of series transformers. In this event, the trolley conductor may comprise a series of insulated sections, each of which receives its current from the trolley feeders independent of the other trolley sections.

From the foregoing description, it will be apparent that I have used the catenary conductor 6, both as a means for supporting the trolley conductor 1, and as an auxiliary conductor for neutralizing and minimizing the magnetic fields generated by the current flow in the trolley conductor. In some instances, it may be unnecessary to insert the series transformers 9, and, in that event, some of the return trolley current is conducted to the catenary conductor 6 by means of the conductors 8. However, a part of the return current will flow along the path comprising the track and ground. In this event, the magnetic fields generated by the current flowing in the trolley conductor 1 will not be entirely neutralized.

In Fig. 2, I have shown the track 2 and the catenary conductor 6 inductively linked by means of series transformers 12, the primary windings 13 of which are inserted at intervals in series-circuit relationship with the track 2, and the secondary windings 14 of which are inserted, at corresponding intervals, in series circuit relationship with the catenary conductor 6. The primary windings 12 are preferably provided with adjustable taps 15 by means of which the ratio between the primary and secondary windings of the transformer may be adjusted. This adjustment of the series transformers 12 permits the amount of current flowing in the catenary conductor 6 and in the track circuit to be regulated, which may be desirable when the telegraph conductor 5 is not spaced equally from the trolley conductor 1 throughout the entire length of the railway system.

In Fig. 3, I have shown the track 2 as composed of a pair of rails 16 which are electrically connected to each other by means of bonds 17, the track being divided into a plurality of sections 18. Series transformers 19 are connected at intervals, as shown, primary windings 20 thereof being connected in series-circuit relationship with the trolley conductor 1, secondary windings 21 being connected, at corresponding intervals, in series-circuit relationship with the catenary conductor 6, and secondary windings 22 being connected at corresponding intervals between adjacent track sections 18. Secondary windings 22 are preferably provided with taps 23 by means of which the amounts of current traversing the track circuit 2 may be controlled. By inductively relating the three conductors, namely, the trolley conductor 1, the catenary conductor 6 and the track 2 by means of the series transformer 19, it is assured that substantially all of the trolley current will return by means of the track 2 and the catenary conductor 6, thereby substantially eliminating ground currents.

From the foregoing description, it is apparent that I have invented means whereby inductive disturbances in telegraph or other circuits that are susceptible to slight inductive disturbances may be substantially neutralized and, at the same time, have provided means for mechanically supporting the trolley conductors.

I claim as my invention:

1. The combination with a power-transmission system comprising two conductors and a circuit for the transmission of intelligence located within the magnetic field of the power-transmission system, of an auxiliary conductor also located within the magnetic field of the power-transmission system, said auxiliary conductor being insulated from, and serving to mechanically support, one of said transmission conductors, and means whereby the current tending to flow through the other transmission conductor will be conducted to, and forced to flow through, said auxiliary conductor.

2. The combination with a power-transmission system and a circuit for the transmission of intelligence located within the magnetic field of the power-transmission system, of an auxiliary low-impedance conductor also located within the magnetic field of the power transmission system, said auxiliary conductor being electrically insulated from, and serving to mechanically support, one conductor of the power transmission system, an electrical connection between said auxiliary conductor and the second conductor of the power transmission system, and means to force substantially all the current, tending to flow through said second conductor, through said auxiliary conductor.

3. The combination with a power-transmission system and a circuit for the transmission of intelligence located within the magnetic field of the power-transmission system, of an auxiliary low-impedance conductor also located within the magnetic field of the power-transmission system, said auxiliary conductor being electrically insulated from, and serving to mechanically support, one conductor of the power transmission system, a plurality of spaced electrical connections between said auxiliary conductor and the second conductor of the power-transmission system, and means whereby the return current will flow through said auxiliary conductor in preference to the said second conductor of the power system.

4. The combination with a railway system comprising a trolley conductor and a track conductor, and a circuit for the transmission of intelligence located within the magnetic field of the railway system, of an auxiliary conductor electrically insulated from, and serving to mechanically support, the trolley conductor, and electrical connections between the auxiliary conductor and the track which, together, constitute paths for the return flow of the trolley current.

5. The combination with a railway system comprising a trolley conductor and a track conductor, and a circuit for the transmission of intelligence located within the magnetic field of the railway system, of an auxiliary conductor located within the magnetic field of the trolley conductor, said auxiliary conductor being electrically insulated from, and serving to mechanically support, the trolley conductor, and electrical connections between the auxiliary conductor and the track which, together, provide parallel paths for the return flow of the trolley current.

6. The combination with a railway system comprising a trolley conductor and a track conductor, and a circuit for the transmission of intelligence located within the magnetic field of the railway system, of an auxiliary conductor located within the magnetic field of the trolley conductor, said auxiliary conductor being electrically insulated from, and serving to mechanically support, the trolley conductor, electrical connections between the auxiliary conductor and the track, and transformers having primary and secondary windings, the primary windings being inserted in series-circuit relationship with each other at spaced intervals in the trolley conductors and the secondary windings being likewise connected at corresponding points in series-circuit relationship in the auxiliary conductor.

7. The combination with a railway system comprising a trolley conductor and a track conductor, and a circuit for the transmission of intelligence located within the magnetic field of the railway system, of an auxiliary conductor located within the magnetic field of the trolley conductor, said auxiliary conductor being electrically insulated from, and serving to mechanically support, the trolley conductor, electrical connections between the auxiliary conductor and the track, and series transformers severally having primary and secondary windings of substantially equal turns respectively connected at intervals in the trolley conductor and in said auxiliary conductor.

8. The combination with a railway system comprising a trolley conductor and a track conductor, and a circuit for the transmission of intelligence located within the magnetic field of the railway system, of an auxiliary conductor located within the magnetic field of the trolley conductor, said auxiliary conductor being electrically insulated from, and serving to mechanically support, the trolley conductor, electrical connections between the auxiliary conductor and the track which, together, constitute the other side of the circuit for the trolley current, and means for adjusting the relative quantities of current flowing in the auxiliary conductor and in the track conductor.

9. The combination with a railway system comprising a trolley conductor and a track conductor, and a circuit for the transmission of intelligence located within the magnetic field of the railway system, of an auxiliary conductor located within the magnetic field of the trolley conductor, said auxiliary conductor being electrically insulated from, and serving to mechanically support, the trolley conductor, electrical connections between the auxiliary conductor and the track which, together, constitute one side of the circuit for the trolley current, and adjustable means to regulate the relative quantities of return current flowing in the auxiliary conductor and in the track conductor.

10. The combination with a railway system comprising a trolley conductor and a track conductor, and a circuit for the transmission of intelligence located within the magnetic field of the railway system, of an auxiliary conductor located within the magnetic field of the trolley conductor, said auxiliary conductor being electrically insulated from, and serving to mechanically support, the trolley conductor, electrical connections between the auxiliary conductor and the track which, together, constitute one side of the circuit for the trolley current, and series transformers severally provided with a primary and a plurality of secondary windings, the primary windings being connected at intervals in the trolley conductor and the secondary windings being respectively connected at corresponding intervals in the auxiliary conductor and in the track conductor.

11. The combination with a railway system comprising a trolley conductor and a track conductor, and a circuit for the transmission of intelligence located within the magnetic field of the railway system, of an auxiliary conductor located within the magnetic field of the trolley conductor, said auxiliary conductor being electrically insulated from, and serving to mechanically support, the trolley conductor, electrical connections between the auxiliary conductor and the track which, together, constitute one side of the circuit for the trolley current, series transformers severally provided with a primary and a plurality of secondary windings, the primary windings being connected at intervals in the trolley conductor and the secondary windings being connected at corresponding intervals respectively in the auxiliary conductor and the track conductor, and means for adjusting the relative quantities of return current flowing in the auxiliary conductor and the track conductor.

In testimony whereof I have hereunto subscribed my name this 23rd day of Dec., 1914.

CHAS. F. SCOTT.

Witnesses:
B. B. Hines,
M. C. Merz.

Copies of this patent may be obtained for five cents each, by addressing the "Commissioner of Patents, Washington, D. C."